US012691873B2

(12) United States Patent
Kim et al.

(10) Patent No.: US 12,691,873 B2
(45) Date of Patent: Jul. 28, 2026

(54) DEVICE FOR MULTIPLE INTERACTIONS BETWEEN MOVING OBJECTS AND AUTONOMOUS VEHICLES AND DRIVING METHOD THEREOF

(71) Applicant: Electronics and Telecommunications Research Institute, Daejeon (KR)

(72) Inventors: Jinwoo Kim, Daejeon (KR); Ki Tae Kim, Daejeon (KR); Kyoung-Wook Min, Daejeon (KR); Myungwook Park, Daejeon (KR); Kyoung Hwan An, Daejeon (KR); MyungIn Ji, Daejeon (KR); Jeong Dan Choi, Daejeon (KR); Seung Jun Han, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 77 days.

(21) Appl. No.: 18/657,179

(22) Filed: May 7, 2024

(65) Prior Publication Data

US 2024/0375647 A1 Nov. 14, 2024

(30) Foreign Application Priority Data

May 8, 2023 (KR) ........................ 10-2023-0059386
Apr. 24, 2024 (KR) ........................ 10-2024-0054455

(51) Int. Cl.
*B60Q 1/00* (2006.01)
*B60W 30/095* (2012.01)
*B60W 50/14* (2020.01)
*G06V 20/58* (2022.01)

(52) U.S. Cl.
CPC ........ *B60W 30/0956* (2013.01); *B60W 50/14* (2013.01); *G06V 20/58* (2022.01); *B60W 2050/143* (2013.01); *B60W 2050/146* (2013.01)

(58) Field of Classification Search
CPC ............. B60W 30/0956; B60W 50/14; B60W 2050/143; B60W 2050/146; G06V 20/58
USPC ........................................................ 340/435
See application file for complete search history.

(56) References Cited

U.S. PATENT DOCUMENTS

| | | | |
|---|---|---|---|
| 10,235,885 B2 | 3/2019 | An et al. | |
| 2017/0036673 A1* | 2/2017 | Lee ......................... | A61B 5/18 |
| 2018/0201138 A1* | 7/2018 | Yellambalase .......... | B60L 58/12 |
| 2020/0110414 A1* | 4/2020 | Dupre ............... | B60W 60/0015 |

(Continued)

FOREIGN PATENT DOCUMENTS

| | | |
|---|---|---|
| JP | 2018-172119 A | 11/2018 |
| KR | 10-2020-0064182 A | 6/2020 |

(Continued)

*Primary Examiner* — Tai T Nguyen
(74) *Attorney, Agent, or Firm* — Sughrue Mion, PLLC

(57) ABSTRACT

Disclosed are a device for multiple interactions between moving objects and autonomous vehicles and a driving method thereof. The device for multiple interactions between moving objects and autonomous vehicles includes memory in which a program for multiple interactions between moving objects and autonomous vehicles has been stored and a processor configured to execute the program. The processor confirms the status of the moving object including at least any one of a nearby vehicle, a pedestrian, and a mobility user and transmits a control command for a notification function that shares situation information.

10 Claims, 5 Drawing Sheets

(56) References Cited

U.S. PATENT DOCUMENTS

| | | | | |
|---|---|---|---|---|
| 2020/0369293 A1* | 11/2020 | Jeon | ...................... | B60W 40/08 |
| 2021/0166564 A1* | 6/2021 | Takaki | ................... | G08G 1/166 |
| 2021/0394793 A1* | 12/2021 | Austin | ................... | G06V 40/18 |
| 2022/0073103 A1 | 3/2022 | An | | |
| 2023/0191911 A1* | 6/2023 | Izumi | ................... | B60W 60/00 |
| | | | | 701/36 |
| 2023/0373516 A1* | 11/2023 | Won | .................... | B60K 35/223 |

FOREIGN PATENT DOCUMENTS

| | | | |
|---|---|---|---|
| KR | 10-2174863 | B1 | 11/2020 |
| KR | 10-2022-0102710 | A | 7/2022 |
| KR | 10-2022-0104244 | A | 7/2022 |
| KR | 10-2023-0020607 | A | 2/2023 |

* cited by examiner

FIG. 3

DEVICE FOR MULTIPLE INTERACTIONS BETWEEN MOVING OBJECTS AND AUTONOMOUS VEHICLES AND DRIVING METHOD THEREOF

This application claims priority to and the benefit of Korean Patent Application Nos. 10-2023-0059386, May 8, 2023, and 10-2024-0054455, Apr. 24, 2024, the disclosure of which is incorporated herein by reference in its entirety.

BACKGROUND

1. Technical Field

The present disclosure relates to a device for multiple interactions between moving objects and autonomous vehicles and a driving method thereof.

2. Related Art

Domestic and foreign automakers currently mass-produce semi-autonomous vehicles having autonomous driving level 2 and level 3, and continue to carry out research and development for handling various road environments and situations.

A current autonomous vehicle manufacturer focuses on the development of recognition, determination, and control technologies for autonomous driving, but the development of a technology in which situation information is understood and shared through interactions with a nearby vehicle or pedestrian is not sufficient.

According to a conventional technology, whether a vehicle is autonomously driving is merely displayed through an LED disposed outside the vehicle or indicated in letters on an electronic display disposed outside the vehicle.

SUMMARY

Various embodiments are directed to proposing a roof design method capable of sharing information on a current situation and dealable level that are recognized by an autonomous vehicle in a multi-modal interaction manner with a nearby vehicle or a pedestrian and exchanging information on the confirmed status of a moving object that is disposed around an autonomous vehicle.

Various embodiments are directed to proposing a device (including a sensor and a display device) capable of smoothly sharing situation information with a surrounding moving object or pedestrian in a situation in which an autonomous vehicle and a common vehicle (e.g., a vehicle not having an autonomous driving function or a vehicle that is manually driven because the autonomous driving function is off) are mixed, and a mutual interaction method.

A device for multiple interactions between moving objects and autonomous vehicles according to an embodiment of the present disclosure includes memory in which a program for multiple interactions between moving objects and autonomous vehicles has been stored and a processor configured to execute the program. The processor confirms the status of the moving object including at least any one of a nearby vehicle, a pedestrian, and a mobility user and transmits a control command for a notification function that shares situation information.

The processor performs a situation determination based on the status of the moving object and the status of an autonomous vehicle, and recognizes mutual intention between the moving object and the autonomous vehicle based on the results of the execution of the situation determination.

The processor recognizes the mutual intention based on the status of the moving object, the status of the autonomous vehicle, continuous mutual-reaction information, and non-reaction information.

The processor transmits the control command for the notification function so that information is transmitted through the outdoor speaker and indoor speaker of the vehicle.

The processor transmits the control command for the notification function to at least any one of an image display unit, a text display unit, a vehicle roof center stripe information display unit, and a vehicle side stripe information display unit.

A driving method of a device for multiple interactions between moving objects and autonomous vehicles according to an embodiment of the present disclosure includes steps of (a) obtaining information on an object around an ego vehicle, (b) performing a situation determination based on the status of the object around the ego vehicle and the status of the ego vehicle, (c) recognizing mutual intention between the object around the ego vehicle and the ego vehicle, and (d) providing notification to the object around the ego vehicle based on the results of the recognition of the mutual intention.

The step (a) includes obtaining information of a moving object including another vehicle, a pedestrian, or a mobility user that is disposed around the ego vehicle by using a camera and a sensor.

The step (b) includes recognizing the status of a nearby object according to a time flow based on information on a position, status, type, direction, speed, and continuous operation situation of the object around the ego vehicle.

The step (b) includes deriving information on a position, movement, status, or intention of the autonomous vehicle based on driving information of the ego vehicle.

The step (d) includes providing notification for the results of the recognition of the mutual intention through an outdoor speaker and indoor speaker of the vehicle.

The results of the recognition of the mutual intention include current status information of the vehicle, nearby object and situation recognition information, continuous mutual-reaction information, and non-reaction information.

The step (d) includes providing the notification through at least any one of an image display unit, a text display unit, a vehicle roof center stripe information display unit, and a vehicle side stripe information display unit in response to a control command.

According to the interaction method proposed by an embodiment of the present disclosure, a nearby object (e.g., a moving object or a pedestrian) and an autonomous vehicle can be supported to mutually confirm status information and can be supported to determine their behaviors suitable for a situation by using the structure of the autonomous driving sensor roof box.

According to an embodiment of the present disclosure, when an autonomous vehicle drives on a common road in the future, measures against a situation can be taken safely and flexibly.

In particular, there can be provided a platform that supports communication between a nearby object and an autonomous vehicle in a situation in which an autonomous vehicle and a common vehicle are mixed by proposing an intuitive interactive type electronic display and a stripe LED display method.

Furthermore, when an autonomous vehicle presents a driving behavior of the autonomous vehicle, which has been determined based on the confirmed status of a nearby object, to the nearby object, a contribution can be made to the establishment of a safe traffic system by providing an efficient interactive interaction through voice recognition and a design display.

Effects of the present disclosure are not limited to the aforementioned effects, and the other effects not described above may be evidently understood by those skilled in the art from the following description.

BRIEF DESCRIPTION OF THE DRAWINGS

FIG. 3 illustrates a device for multiple interactions between moving objects and autonomous vehicles according to an embodiment of the present disclosure.

DETAILED DESCRIPTION

Figure 1:
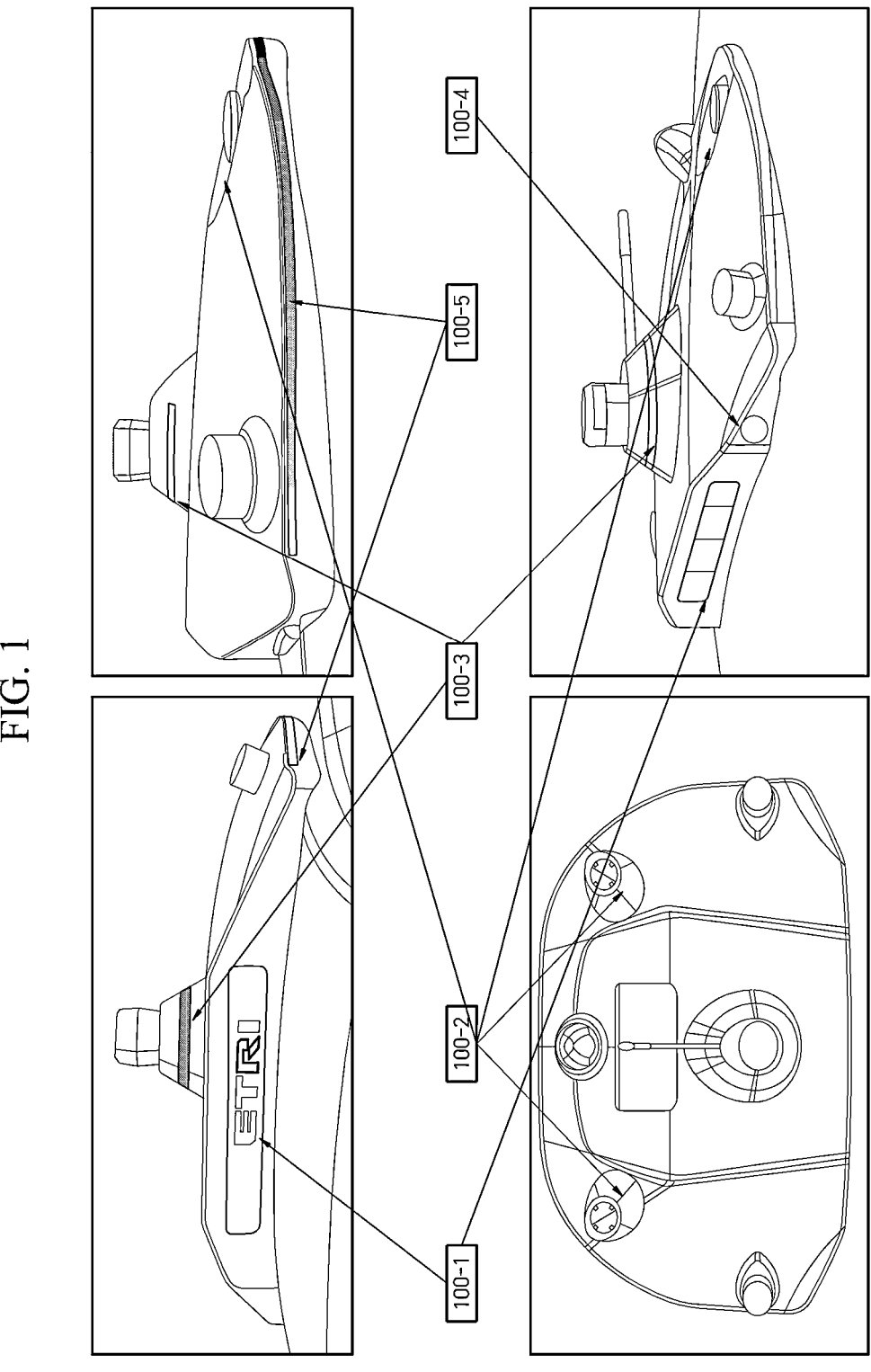
FIG. 1 illustrates a vehicle sensor structure and display device according to an embodiment of the present disclosure.

The aforementioned object, other objects, advantages, and characteristics of the present disclosure and a method for achieving the objects, advantages, and characteristics will become clear with reference to embodiments to be described in detail along with the accompanying drawings.

However, the present disclosure is not limited to embodiments disclosed hereinafter, but may be implemented in various different forms. The following embodiments are merely provided to easily notify a person having ordinary knowledge in the art to which the present disclosure pertains of the objects, constructions, and effects of the present disclosure. The scope of rights of the present disclosure is defined by the writing of the claims.

Terms used in this specification are used to describe embodiments and are not intended to limit the present disclosure. In this specification, an expression of the singular number includes an expression of the plural number unless clearly defined otherwise in the context. The term "comprises" and/or "comprising" used in this specification does not exclude the presence or addition of one or more other components, steps, operations and/or components in addition to mentioned components, steps, operations and/or components.

The existing vehicle can merely transmit driving intention to surroundings by using a turn signal, an up light, or a klaxon, but does not have sufficient means for accurate communication with a nearby object. For this reason, a nearby object and a vehicle may confront each other, or a collision accident between the nearby object and the vehicle may occur.

An embodiment of the present disclosure proposes a device that is mounted on a sensor roof or an autonomous vehicle and that supports intuitive mutual-recognition between the autonomous vehicle and a nearby vehicle or pedestrian by sharing information with the nearby vehicle or pedestrian in an environment in which the autonomous vehicle drives on a road.

An embodiment of the present disclosure proposes a multi-interaction technology in which information obtained by recognizing a surrounding moving object (e.g., a vehicle or a pedestrian) by using a sensor mounted on an autonomous vehicle can be used and the condition of an autonomous vehicle and driving intention of the autonomous vehicle can be efficiently transmitted to a nearby object. MA4MI means Moving object and Autonomous driving for Multi Interaction.

According to an embodiment of the present disclosure, it is possible to solve a situation in which what behavior will be taken between an autonomous vehicle and a nearby vehicle or pedestrian is unclear when the autonomous vehicle drives on a common road or operates in a common environment because intuitive communication between multiple objects and autonomous vehicles is possible.

According to an embodiment of the present disclosure, it is possible to support a flexible traffic flow and to prevent an accident.

1. Device and Structure for Multi-Object Interaction

Hereinafter, a construction, design, and structure design for a roof sensor mount according to an embodiment of the present disclosure are described.

FIG. 1 illustrates a vehicle sensor structure and display device (a construction for a roof sensor mount) according to an embodiment of the present disclosure. FIG. 1 illustrates a construction for recognizing, by an autonomous vehicle, an external moving object (e.g., a vehicle or a pedestrian) and performing communication suitable for a situation with the external moving object.

In an embodiment of the present disclosure, a color, brightness, a movement, and an array are adjusted in relation to the display of driving intention and a driving status by proposing a side and rear interaction design.

A display unit 100-1 displays an image or text so that the image or text can be checked within a range of 240 degrees on the basis of the front of a vehicle. An object or pedestrian around a vehicle predicts the behavior of the vehicle by recognizing an image or text that is displayed by the display unit 100-1.

Specifications (e.g., a depth, a width, and an angle) of a sensing unit 100-2 are adjusted by considering a view angle of a GPS antenna, a light, or a radio wave interference influence between pieces of surrounding LIDAR.

A lighting unit includes a vehicle roof center stripe information display unit 100-3 and a vehicle side stripe information display unit 100-5. The lighting unit has a silicon processing structure for surface light emission not a dot method, and is a device capable of displaying a color and a left and right movement direction in real time.

A speaker 100-4 is a sound output device for external transmission, and it transmits the status of the vehicle in synchronization with the display unit 100-1 and provides information obtained by recognizing a behavior and situation of a nearby object through a sound.

The display unit 100-1 simply displays a path along which an autonomous vehicle moves based on the status, behavior, or situation of the autonomous vehicle and a point at which the autonomous vehicle stops in text, and also transmits a status that is recognized by the autonomous vehicle in real time by considering a mutual relation between the autonomous vehicle and a nearby object (e.g., a vehicle, a mobility, or a pedestrian) based on the status of the nearby object and the results of the recognition of a surrounding situation.

According to an embodiment of the present disclosure, in order to help understanding of those skilled in the art, an example in which the display device has been mounted on a vehicle roof has been illustrated. According to an embodiment of the present disclosure, the intuitive display of interaction results is possible through a roof box including a sensor housing or mount including a display device, a surrounding sensor, and the structure of a stripe LED.

Hereinafter, a design and structure design for a multi-camera mount to be mounted on front interior glass is described.

Figure 2:
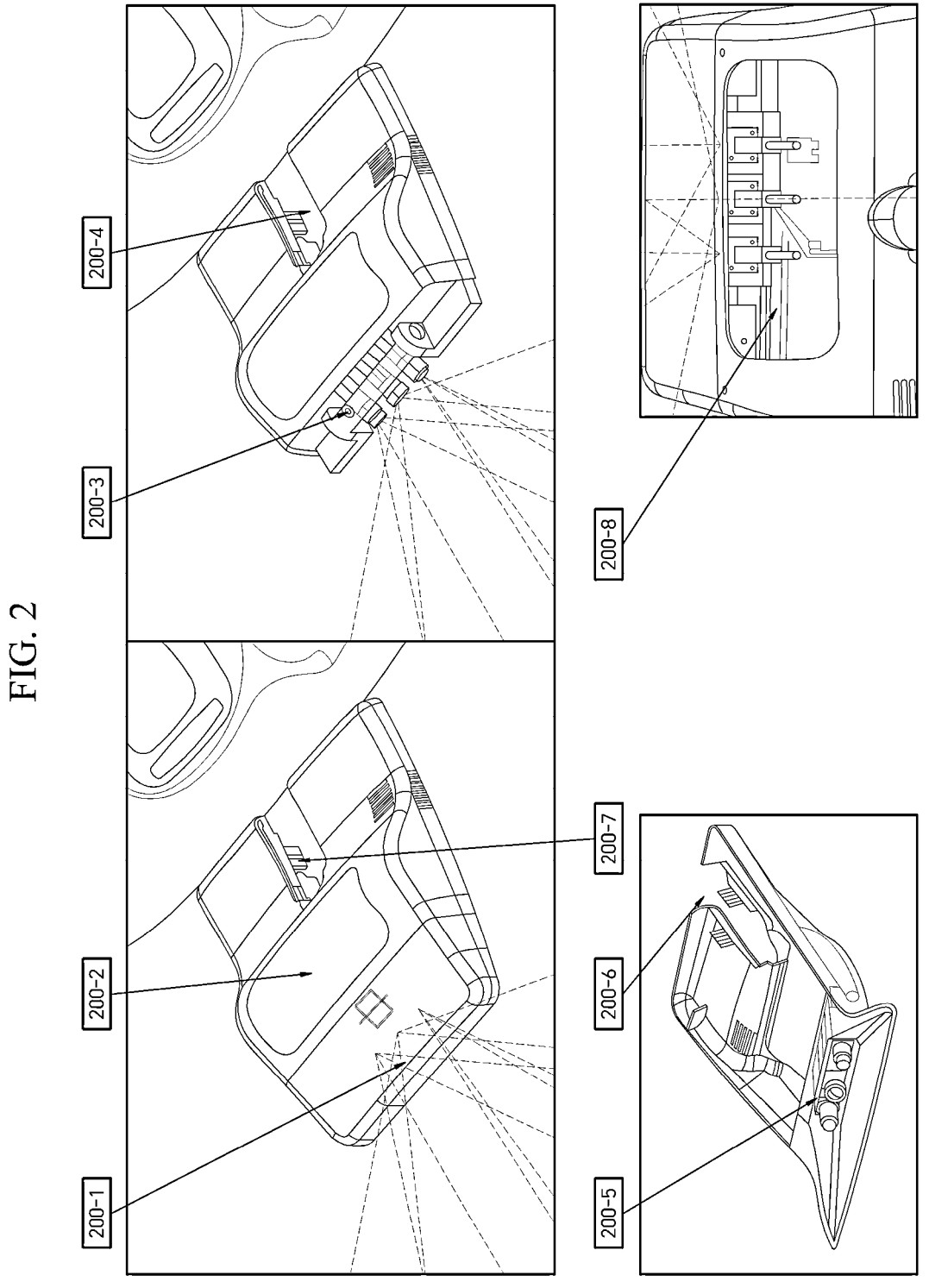
FIG. 2 illustrates a structure for a multi-camera mount that has been mounted on front interior glass according to an embodiment of the present disclosure.

FIG. 2 illustrates a structure for a multi-camera mount that has been mounted on front interior glass according to an embodiment of the present disclosure.

A multi-camera mount cover 200-1 that is mounted on the front window (front windshield) or rear surface of a vehicle may be attached to a vehicle having a cover in a room mirror thereof. A camera is attached within the multi-camera mount cover.

The multi-camera mount cover 200-1 is a cover for preventing an image from being reflected by a vehicle window, and is designed so that the multi-camera mount cover can be varied up, down, left, and right by considering needs for the application of various camera view angles depending on a user.

A cable connector that is connected to a camera and a tilt device that adjusts the camera up and down are constructed within a cover 200-2.

Camera adjusting/fixing devices 200-3 and 200-5 are disposed within a cover interior space 200-8. A worker may finely adjust the angle of the camera in a way to fasten or release a screw.

Camera wires gather in the ceiling direction of a vehicle through passages 200-4 and 200-6. The camera wires are not bent or folded by the passage 200-4 and 200-6. A room mirror passes through the center of the passages 200-4 and 200-6 and is fixed thereto.

2. Multi-Interaction Method Between Moving Objects and Autonomous Vehicles

Figure 3:
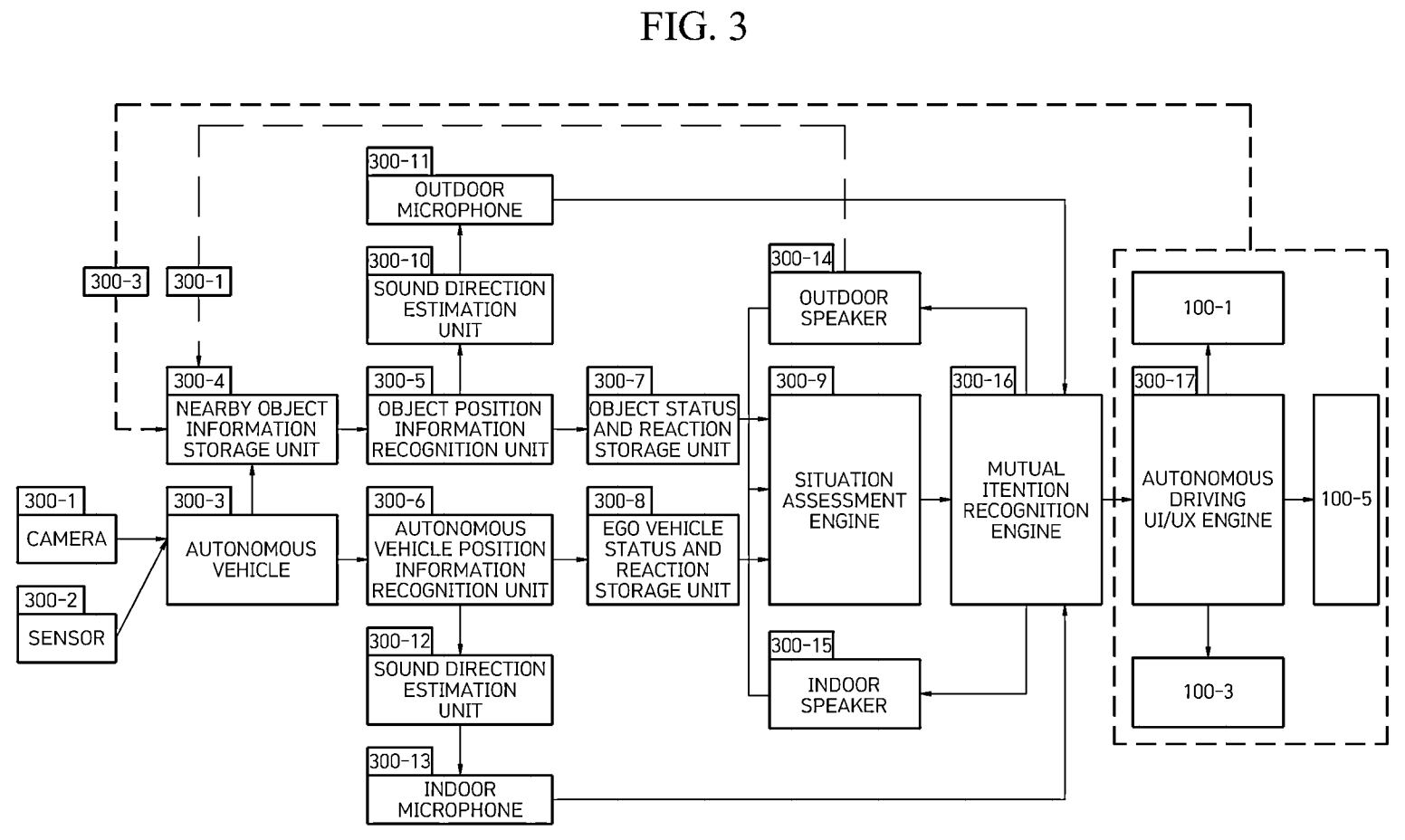

FIG. 3 illustrates a device for multiple interactions between moving objects and autonomous vehicles according to an embodiment of the present disclosure. FIG. 3 illustrates a structure in which status information is shared between vehicles or between a vehicle and a pedestrian by using the device illustrated in FIGS. 1 and 2.

An autonomous vehicle 300-3 receives information from a camera 300-1 and a sensor 300-2, and recognizes an object that is disposed at surrounding 360 degrees or a specific point.

A nearby object information storage unit 300-4 stores the results of the recognition of a nearby object, which are output by the autonomous vehicle 300-3. Information on the position, status, type, direction, speed, and continuous operation situation of the autonomous vehicle 300-3 is updated and stored in the nearby object information storage unit 300-4.

The position of a nearby object is estimated and an interested area is estimated, based on information that is obtained from an outdoor microphone 300-11 and an indoor microphone 300-13.

Information is provided to an object at a corresponding position through a sound on which the object may concentrate, through an outdoor speaker 300-14 and an indoor speaker 300-15.

An object position information recognition unit 300-5 derives information on the position of an object based on information that is received from the nearby object information storage unit 300-4, and recognizes the status of a nearby object according to a time flow. For example, the object position information recognition unit 300-5 recognizes a status which may occur due to a behavior that has been intended or not intended by a nearby vehicle, such as a cutting-in line or a sudden stop. Furthermore, in order to recognize a unique characteristic and behavior of a nearby object, such as a pedestrian, a Kickboard, or a motorcycle, the object position information recognition unit 300-5 estimates information on the status of the nearby object. Information that has been derived by the object position information recognition unit 300-5 is transmitted to an object status and reaction storage unit 300-7. Output information of the object status and reaction storage unit 300-7 is transmitted to a situation assessment engine 300-9.

An autonomous vehicle position information recognition unit 300-6 derives autonomous vehicle position information by receiving information on an ego vehicle from an autonomous vehicle 300-3.

The autonomous vehicle position information is transmitted to an ego vehicle status and reaction storage unit 300-8. Output information of the ego vehicle status and reaction storage unit 300-8 is transmitted to the situation assessment engine 300-9. Output information of the ego vehicle status and reaction storage unit 300-8 is synchronized with output information of the object status and reaction storage unit 300-7, and includes information on the movement, status, or intention of an ego vehicle.

The situation assessment engine 300-9 performs a situation determination and recognition according to a continuous time flow, based on data that are provided by the object status and reaction storage unit 300-7 and the ego vehicle status and reaction storage unit 300-8, and transmits the results of the execution of the situation determination and recognition to a mutual intention recognition engine 300-16.

The mutual intention recognition engine 300-16 recognizes mutual intention between an autonomous vehicle and a nearby object thereof.

The results of the recognition of the mutual intention, which have been finally recognized by the mutual intention recognition engine 300-16, provide notification for the results of the recognition of the mutual intention through the outdoor speaker 300-14 and the indoor speaker 300-15. The results of the recognition of the mutual intention are not transmitted to a nearby object in an input and output manner, but are transmitted to a nearby vehicle, a pedestrian, and another mobility user visually and audibly.

The results of the recognition of the mutual intention recognized by the mutual intention recognition engine 300-16 transmitted to an autonomous driving UI/UX engine 300-17. Mutual intention recognition information that is output by the mutual intention recognition engine 300-16 includes current status information of a vehicle, nearby object and situation recognition information, continuous mutual-reaction information, and non-reaction information. The mutual intention recognition information is transmitted to the autonomous driving UI/UX engine 300-17.

The display unit 100-1, the vehicle roof center stripe information display unit 100-3, and the vehicle side stripe information display unit 100-5 that have received a control command from the autonomous driving UI/UX engine 300-17 exchange feedback information capable of interacting with an external nearby object with each other in real time.

The results of a reaction or non-reaction from an external object are obtained through the camera 300-1 and the sensor 300-2. The aforementioned process is repeatedly performed. The results of a reaction and feedback from a nearby object are analyzed in real time.

The sound direction estimation unit 300-10 estimates the direction of an autonomous vehicle based on information that is received from the object position information recognition unit 300-5. The outdoor microphone 300-11 classifies a level and status in which the autonomous vehicle may now drive by obtaining and analyzing a surrounding horn, rain, or a human sound. The information obtained by the outdoor microphone 300-11 is used to check whether an external object (e.g., a pedestrian, a driver of another vehicle, or other mobility user) has recognized intention of the autonomous vehicle and a reaction therefrom.

A sound direction estimation unit 300-12 estimates the direction of an autonomous vehicle based on information that is received from the autonomous vehicle position information recognition unit 300-6. The indoor microphone 300-13 determines whether a driver, a passenger, or an operator feels seriousness, discomfort, or anxiety by recognizing a sound and a language that are produced during autonomous driving or manual driving. The information that is obtained by the indoor microphone 300-13 is used as an input value for controlling the driving status of the autonomous vehicle, a change in the driving mode for safe driving, and for providing information for an interaction.

Figure 4:
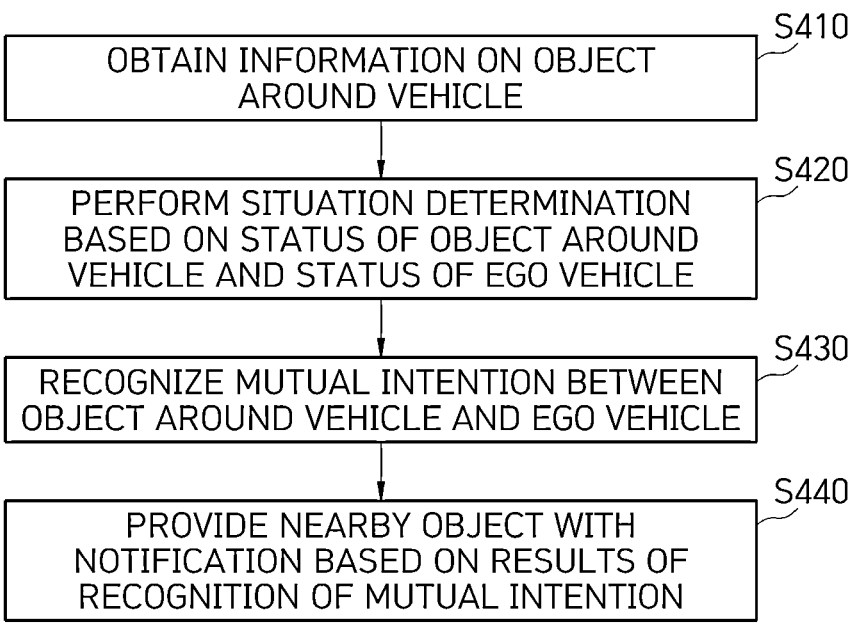
FIG. 4 illustrates a driving method of a device for multiple interactions between moving objects and autonomous vehicles according to an embodiment of the present disclosure.

FIG. 4 illustrates a driving method of the device for multiple interactions between moving objects and autonomous vehicles according to an embodiment of the present disclosure.

The driving method of the device for multiple interactions between moving objects and autonomous vehicles according to an embodiment of the present disclosure includes step S410 of obtaining information on an object around an ego vehicle, step S420 of performing a situation determination based on the status of the object around the ego vehicle and the status of the ego vehicle, step S430 of recognizing mutual intention between the object around the ego vehicle and the ego vehicle, and step S440 of providing a nearby object with notification based on the results of the recognition of the mutual intention.

In step S410, the autonomous vehicle obtains information on a moving object (e.g., a vehicle or a pedestrian) that is disposed around the autonomous vehicle by using the camera and the sensor.

In step S420, the autonomous vehicle recognizes the status of a nearby object according to a time flow based on information on the position, status, direction, speed, and continuous operation situation of the nearby object.

In step S420, the autonomous vehicle derives information on the position of the autonomous vehicle and information on the movement, status, or intention of the ego vehicle based on driving information of the ego vehicle.

In step S420, the autonomous vehicle determines a situation based on the status of the nearby object around the ego vehicle and the status of the ego vehicle.

In step S430, the autonomous vehicle recognizes mutual intention between the autonomous vehicle and the nearby object based on the results of the situation determination.

In step S440, the autonomous vehicle provides the nearby object with notification for the results of the recognition of the mutual intention. In this case, information is transmitted through the outdoor speaker of the vehicle and the indoor speaker of the vehicle.

In step S440, the results of the recognition of the mutual intention include current status information of the vehicle, nearby object and situation recognition information, continuous mutual-reaction information, and non-reaction information. The notification is provided through the display unit, the vehicle roof center stripe information display unit, and the vehicle side stripe information display unit in response to a control command.

Figure 5:
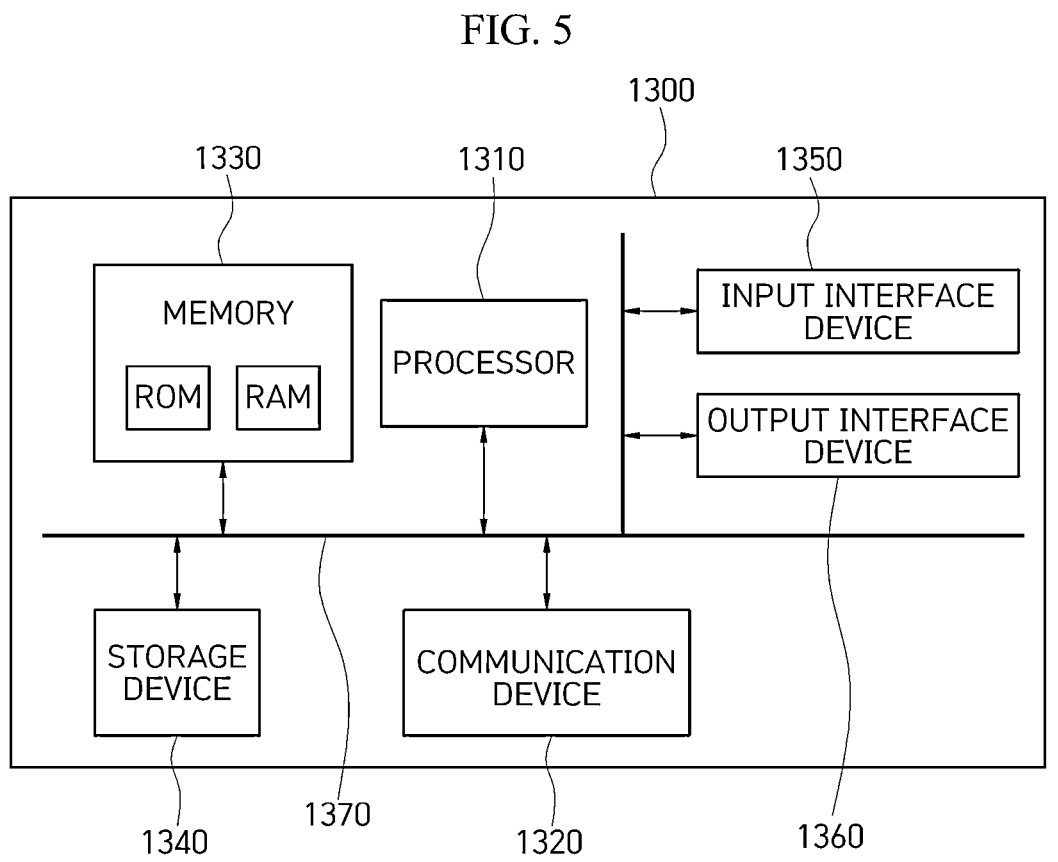
FIG. 5 is a block diagram illustrating a computer system for implementing the driving method according to an embodiment of the present disclosure.

FIG. 5 is a block diagram illustrating a computer system for implementing the driving method according to an embodiment of the present disclosure.

Referring to FIG. 5, a computer system 1300 may include at least one of a processor 1310, memory 1330, an input interface device 1350, an output interface device 1360, and a storage device 1340, which communicate with each other through a bus 1370. The computer system 1300 may also include a communication device 1320 that is connected to a network. The processor 1310 may be a central processing unit (CPU) or may be a semiconductor device that executes an instruction stored in the memory 1330 or the storage device 1340. The memory 1330 and the storage device 1340 may each include volatile or non-volatile storage media having various forms. For example, the memory may include read only memory (ROM) and random access memory (RAM). In an embodiment of this specification, the memory may be disposed inside or outside the processor. The memory may be connected to the processor through various means that have already been known. The memory includes volatile or non-volatile storage media having various forms. The memory may include ROM or RAM, for example.

The device for multiple interactions between moving objects and autonomous vehicles according to an embodiment of the present disclosure includes the memory 1330 in which a program for multiple interactions between moving objects and autonomous vehicles has been stored and the processor 1310 that executes the program. The processor 1310 confirms the status of a moving object including at least any one of a nearby vehicle, a pedestrian, and a mobility user, and transmits a control command for a notification function that shares situation information.

The processor 1310 performs a situation determination based on the status of a moving object and the status of an autonomous vehicle, and recognizes mutual intention between the moving object and the autonomous vehicle based on the results of the execution of the situation determination.

The processor 1310 recognizes mutual intention based on the status of a moving object, the status of an autonomous vehicle, continuous mutual-reaction information, and non-reaction information.

The processor 1310 transmits a control command for the notification function SO that information is transmitted through the outdoor speaker and indoor speaker of a vehicle.

The processor 1310 transmits a control command for the notification function to at least one of the image display unit, the text display unit, the vehicle roof center stripe e information display unit, and the vehicle side stripe information display unit.

Accordingly, an embodiment of the present disclosure may be implemented as a method implemented in a computer or may be implemented as a non-transitory computer-readable medium in which a computer-executable instruction has been stored. In an embodiment, when being executed by a processor, a computer-readable instruction may perform a method according to at least one aspect of this writing.

The communication device 1320 may transmit or receive a wired signal or a wireless signal.

Furthermore, the method according to an embodiment of the present disclosure may be implemented in the form of a program instruction which may be executed through various computer means, and may be recorded on a computer-readable medium.

The computer-readable medium may include a program instruction, a data file, and a data structure alone or in combination. A program instruction recorded on the computer-readable medium may be specially designed and constructed for an embodiment of the present disclosure or may be known and available to those skilled in the computer software field. The computer-readable medium may include a hardware device configured to store and execute the program instruction. For example, the computer-readable medium may include magnetic media such as a hard disk, a floppy disk, and a magnetic tape, optical media such as CD-ROM and a DVD, magneto-optical media such as a floptical disk, ROM, RAM, and flash memory. The program instruction may include not only a machine code produced by a compiler, but a high-level language code capable of being executed by a computer through an interpreter.

The embodiments of the present disclosure have been described in detail, but the scope of rights of the present disclosure is not limited thereto. A variety of modifications and changes of those skilled in the art using the basic concept of the present disclosure defined in the appended claims are also included in the scope of rights of the present disclosure.

What is claimed is:

1. A device for multiple interactions between moving objects and autonomous vehicles, comprising:

memory in which a program for multiple interactions between moving objects and autonomous vehicles has been stored; and a processor configured to execute the program, wherein the processor confirms a status of the moving object comprising at least one of a nearby vehicle, a pedestrian, and a mobility user and transmits a control command for a notification function that shares situation information through an interaction platform mounted on an upper roof region of the autonomous vehicle, wherein the interaction platform comprises at least one of an image display unit, a text display unit, a vehicle roof center stripe information display unit, and a vehicle side stripe information display unit, and wherein the notification function is configured to provide multimodal notification through at least two of the vehicle roof center stripe information display unit, the vehicle side stripe information display unit, and an outdoor speaker of the autonomous vehicle.

2. The device of claim 1, wherein the processor performs a situation determination based on the status of the moving object and a status of an autonomous vehicle, and recognizes mutual intention between the moving object and the autonomous vehicle based on results of the execution of the situation determination.

3. The device of claim 2, wherein the processor recognizes the mutual intention based on the status of the moving object, the status of the autonomous vehicle, continuous mutual-reaction information, and non-reaction information.

4. The device of claim 1, wherein the processor transmits the control command for the notification function so that information is transmitted through an indoor speaker of the vehicle.

5. A driving method of a device for multiple interactions between moving objects and autonomous vehicles, the driving method comprising steps of:

(a) obtaining information on an object around an ego vehicle;

(b) performing a situation determination based on a status of the object around the ego vehicle and a status of the ego vehicle;

(c) recognizing mutual intention between the object around the ego vehicle and the ego vehicle; and (d) providing notification to the object around the ego vehicle based on results of the recognition of the mutual intention through an interaction platform mounted on an upper roof region of the ego vehicle, wherein the interaction platform comprises at least one of an image display unit, a text display unit, a vehicle roof center stripe information display unit, and a vehicle side stripe information display unit, and wherein the providing notification comprises providing multimodal notification through at least two of the vehicle roof center stripe information display unit, the vehicle side stripe information display unit, and an outdoor speaker of the ego vehicle.

6. The driving method of claim 5, wherein the step (a) comprises obtaining information of a moving object comprising another vehicle, a pedestrian, or a mobility user that is disposed around the ego vehicle by using a camera and a sensor.

7. The driving method of claim 5, wherein the step (b) comprises recognizing a status of a nearby object according to a time flow based on information on a position, status, type, direction, speed, and continuous operation situation of the object around the ego vehicle.

8. The driving method of claim 5, wherein the step (b) comprises deriving information on a position, movement, status, or intention of the autonomous vehicle based on driving information of the ego vehicle.

9. The driving method of claim 5, wherein the step (d) comprises providing notification for the results of the recognition of the mutual intention through an indoor speaker of the vehicle.

10. The driving method of claim 5, wherein the results of the recognition of the mutual intention comprise current status information of the vehicle, nearby object and situation recognition information, continuous mutual-reaction information, and non-reaction information.

* * * * *